United States Patent [19]

Amundson

[11] Patent Number: 4,948,169
[45] Date of Patent: Aug. 14, 1990

[54] STORAGE APPARATUS FOR FLATBED TRAILERS

[76] Inventor: Lloyd A. Amundson, 29453 Culver La., Junction City, Oreg. 97448

[21] Appl. No.: 403,392

[22] Filed: Sep. 6, 1989

[51] Int. Cl.$^5$ .............................................. B62D 25/20
[52] U.S. Cl. ..................................... 280/769; 182/88; 296/37.14
[58] Field of Search ..................... 280/769, 163, 166; 296/37.2, 37.6, 37.14; 182/88, 91; 312/266, 269, 319

[56] References Cited

U.S. PATENT DOCUMENTS

| | | | |
|---|---|---|---|
| 976,561 | 11/1910 | Evans | 296/37.14 |
| 2,455,417 | 12/1948 | Holan et al. | 296/37.6 X |
| 3,764,048 | 10/1973 | Gore | 296/37.14 X |
| 4,087,032 | 5/1978 | Miller et al. | 296/37.2 X |
| 4,623,160 | 11/1986 | Trudell | 280/166 |
| 4,830,242 | 5/1989 | Painter | 296/37.6 X |

Primary Examiner—Charles A. Marmor
Assistant Examiner—Michael Mar
Attorney, Agent, or Firm—John F. Ingman

[57] ABSTRACT

A storage apparatus for flatbed trailers includes a storage box which swings out to the side from beneath the trailer bed for loading and unloading. When in an up, traveling position, a lip on the front of the storage box engages a flange of the trailer side rail to support the front of the box, while a U-shaped frame connected to the trailer framework provides support beneath the rear of the box. Two arm members are pivotally mounted between the trailer framework and the sides of the box, and support the box while not in the up position. The pivotal attachments of the arm members to the box are located so that the box is unbalanced with the front biased downwards. Curved rail members, supported by the trailer framework, engage rollers attached to the rear of the box to control its upward movement. Dual-acting air cylinders are pivotally attached between the trailer framework and the arm members. Retraction of the air cylinders disengages the front of the box from the side rail and allows it to drop, thereby disengaging support from the rear of the box. Expansion of the air cylinder then pivots the attached arm member and box down and outward until the box is exposed. Subsequent retraction of the air cylinder pivots the attached arm member and storage box up and beneath the flatbed trailer. Manual lifting of a handle member on the front of the box engages the rear of the box with the U-frame support and, while so lifted, expansion of the air cylinder reengages the front of the box with the trailer side rail.

11 Claims, 3 Drawing Sheets

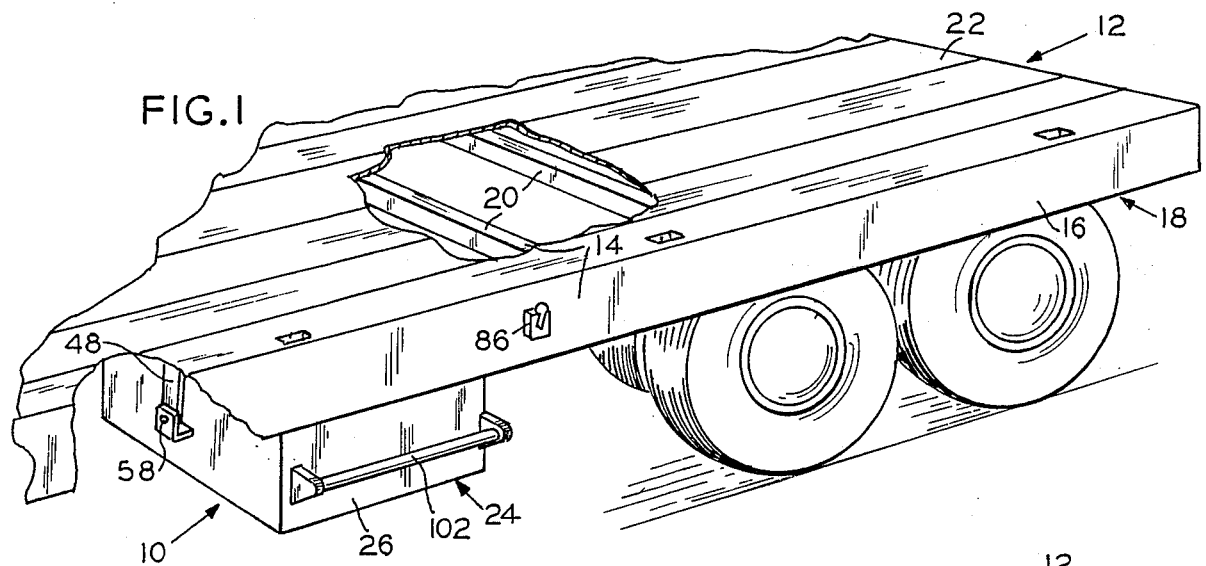
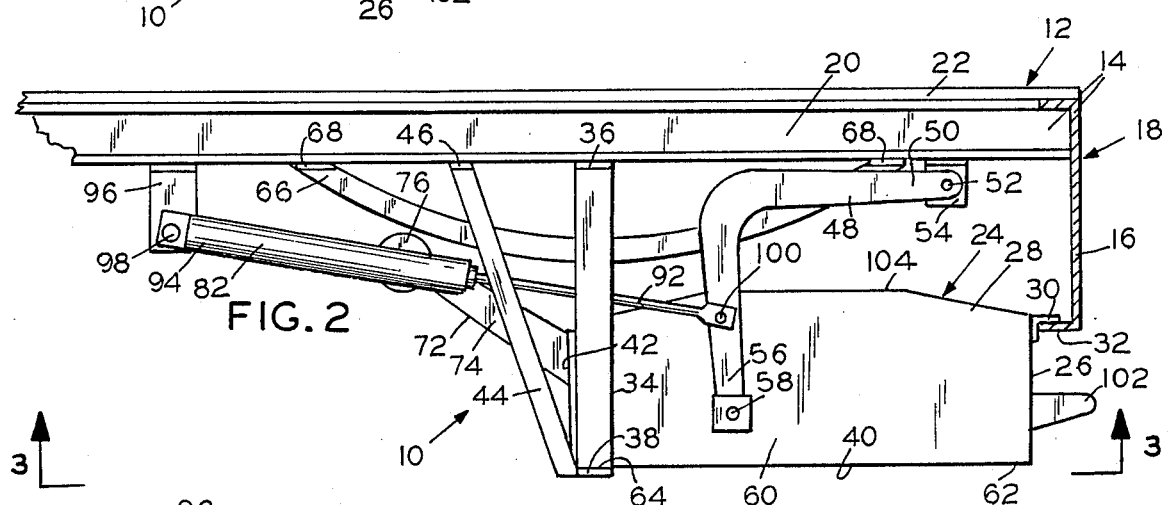

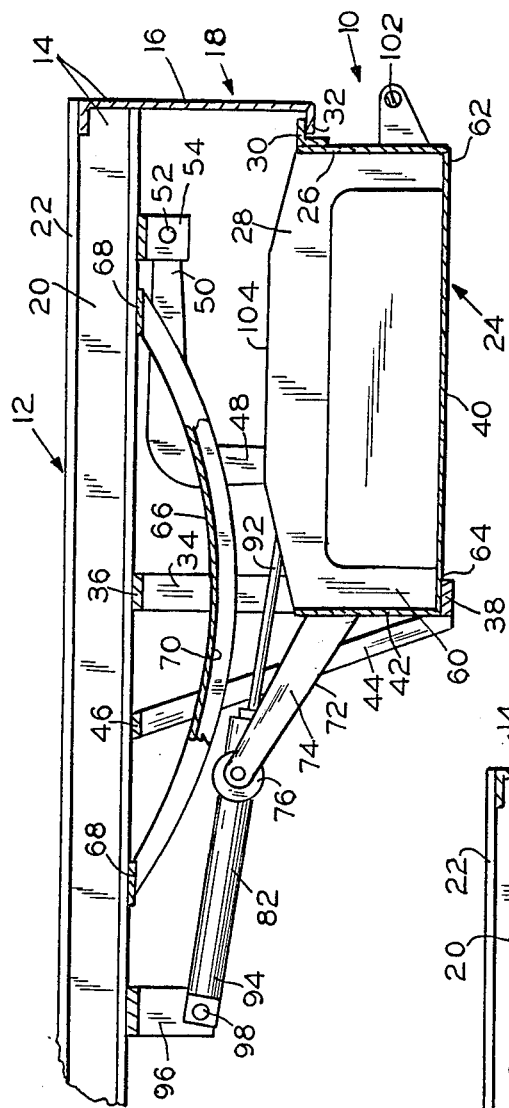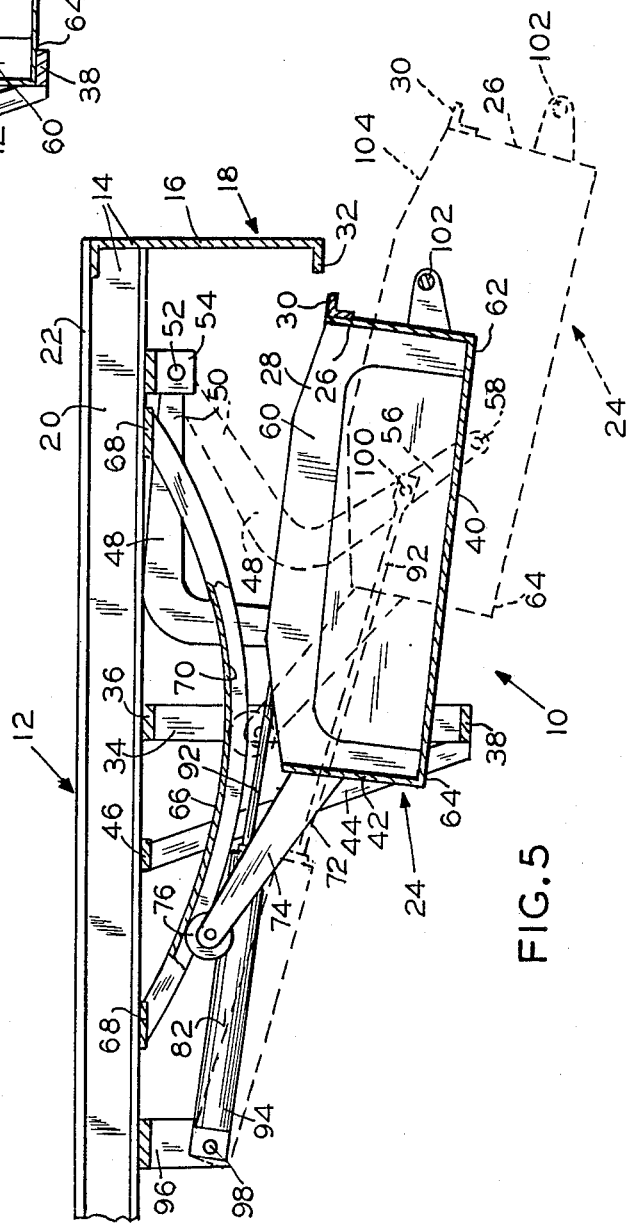

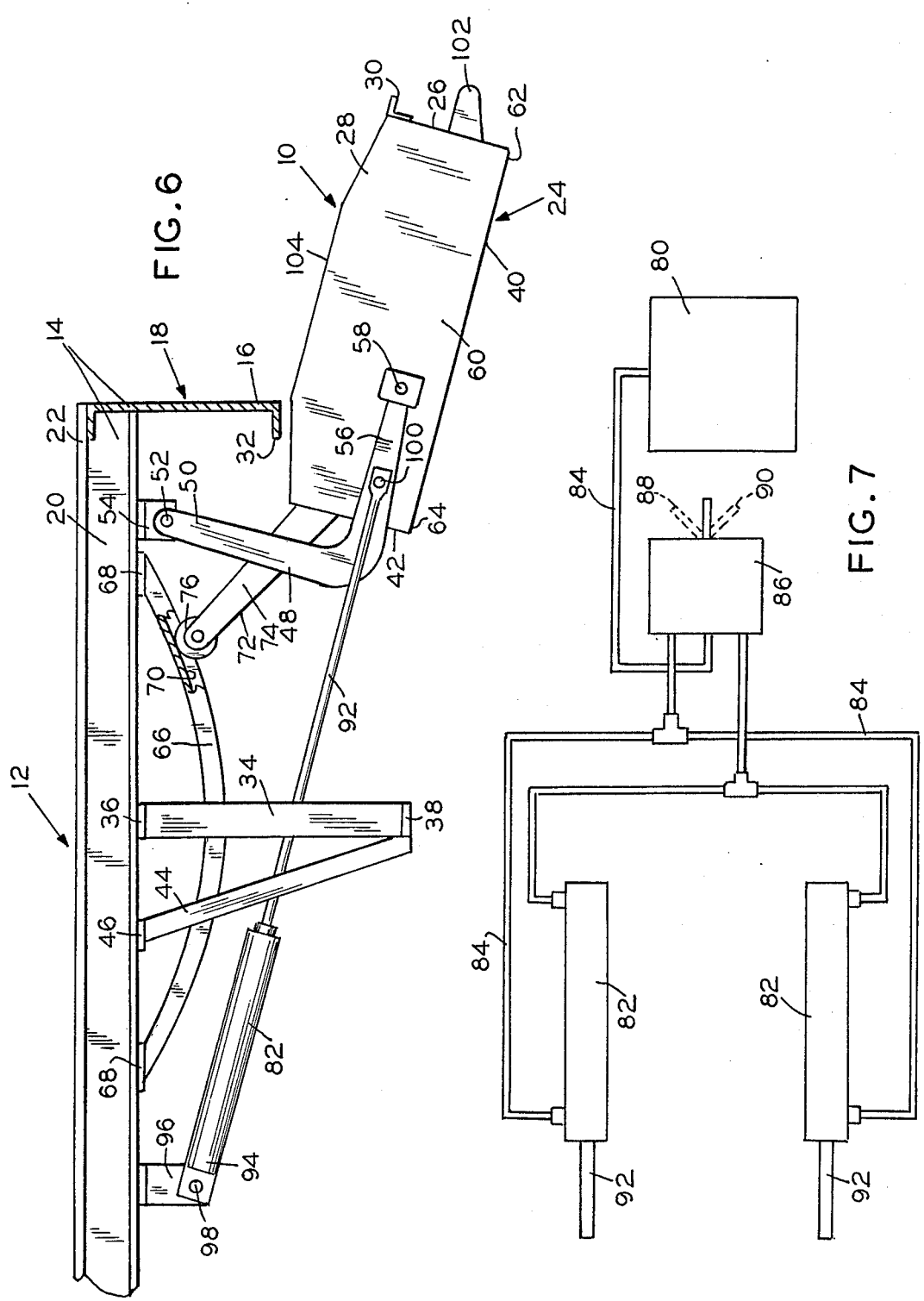

000
STORAGE APPARATUS FOR FLATBED TRAILERS

BACKGROUND OF THE INVENTION

1. Field of the Invention

This invention involves a storage apparatus for tarpaulins and the like aboard a flatbed trailer, and more particularly, a storage box, which may be power-assisted as by air pressure, that swings out from beneath the trailer bed for easy access to the box and returns to a trailer frame supported position for travel.

2. Description of the Prior Art

Conventionally on flatbed trailers, a storage box for tarpaulins used aboard the trailer is permanently mounted beneath the bed of the trailer on the frame members. In order to use this storage box, i.e., to place one or more tarpaulins in the box or to remove them for use, the driver must work beneath the trailer bed on his knees, or crouch severely, to manhandle the heavy tarpaulins. This becomes a very disagreeable task, with the result that drivers habitually tie folded tarpaulins on the top of the bed, thereby inviting loss or theft. In fact, it is not unusual for drivers to remove the unused conventional tarpaulin box from their flatbed trailers.

What is needed is a storage apparatus for tarpaulins which allows use without the driver having to physically handle the tarpaulins beneath the bed of the trailer.

SUMMARY OF THE INVENTION

The present invention provides a storage apparatus for flatbed trailers which meets the aforementioned need. The invention involves a storage box which swings out from beneath the trailer bed for the receiving or removing of the trailer tarpaulins and then returns to a trailer frame supported position for travel.

Accordingly, in its preferred embodiment, the storage apparatus for flatbed trailers includes a storage box for tarpaulins and the like, which, when installed, has its front oriented parallel to the longitudinal side rails of the flatbed trailer. A handle is attached to the front of the storage box. A first support means is provided for supporting the storage box in an up, traveling position beneath the trailer which structurally and rigidly engages with the framework of the trailer, so as to completely support the weight of the storage box and contents. This first support means includes a front support member in the form of a lip attached horizontally on, and extending outwardly from, the front of the storage box so as to engage on top of an inwardly extending flange of the side rail of the trailer, so as to support the front of the storage box; and a rear support member, in the form of a U-shaped frame whose legs are rigidly connected to the framework of the trailer, and whose horizontal base engages, and provides support, beneath the rear of the storage box.

A second, and separate, support means is used to support the storage box and its contents while in transition between the up, traveling position and the down, loading and unloading position. The second support means pivotally connects with the framework of the trailer, and includes two arm members, one on each side of the storage box, each of which is pivotally mounted between the trailer framework and a side of the storage box. The arm members may be curved so as, when in the down position, to project outward of a longitudinal side rail of the trailer.

The pivotal attachments of the two arm members on the opposing sides of the box are located so that the storage box is pivotally unbalanced with the front of the box biased downwards. In order to control the upward movement of the rear of the storage box while the storage box is supported by the second support means, two curved rail members, supported by the framework of the trailer and having their riding surface generally facing downwards, are positioned to engage with corresponding roller assemblies, each of which have a roller support arm rigidly attached to the rear of the storage box and extending upwardly therefrom, with a roller at the outer end which rotatingly engages a rail member.

Pneumatic power-assist means are provided which include a pair of dual-acting air cylinders capable of linear expansion or retraction under air pressure. One end of each air cylinder is pivotally attached to the framework of the trailer while the other end is pivotally connected to the arm members of the second support means. Air pressure is supplied from the air tank aboard the trailer, through air-carrying tubing passing through a pneumatic switch which directs the air pressure to the dual-acting air cylinders so as to create linear expansion or retraction of air cylinders, as desired.

The method of storage, in combination with flatbed trailers, includes the following steps:

a. retracting a two-way air cylinder, attached to an arm member pivotally mounting a storage box to the trailer framework, thereby disengaging a front support member, attached to the front of the storage box, from an inwardly extending flange of the longitudinal side rail, and allowing the front support member to drop below the side rail, thereby disengaging a rear support member, rigidly attached to the trailer framework, from support of the rear of the storage box;

b. expanding the air cylinder, thereby pivoting the attached arm member and storage box downwards and outwardly until the storage box is exposed below and outside of the longitudinal side rail of the trailer;

c. loading and unloading the storage box, as desired;

d. retracting the air cylinder, thereby pivoting the attached arm member and storage box upwardly and beneath the flatbed trailer;

e. lifting manually a handle member attached to the front of the storage box, thereby engaging the rear of the storage box with a rear support member rigidly mounted to the framework of the trailer, and, while lifting;

f. expanding the air cylinder, thereby reengaging the front support member of the storage box atop the inwardly extending flange from the longitudinal side rail of the trailer.

BRIEF DESCRIPTION OF THE DRAWINGS

FIG. 1 illustrates a perspective view of a flatbed trailer showing the storage apparatus of the present invention in the up, traveling position.

FIG. 2 illustrates a side view of the storage apparatus of FIG. 1.

FIG. 3 illustrates a bottom view of the storage apparatus, as seen at line 3—3 of FIG. 2.

FIG. 4 illustrates a sectional side view of the storage apparatus as seen in FIG. 2.

FIG. 5 illustrates a sectional side view of the storage apparatus in transition between the up, traveling and the down, loading and unloading positions, with a different transition position being indicated in dashed lines.

FIG. 6 illustrates a side view of the storage apparatus, in the down, loading and unloading position.

FIG. 7 illustrates a schematic view of a pneumatic arrangement used to power-assist the movement of the storage box.

DESCRIPTION OF THE PREFERRED EMBODIMENT

Referring now to the drawings, there is shown in FIG. 1 the storage apparatus for flatbed trailers 10 as mounted on the left side of a flatbed trailer 12 in the up, traveling position. The typical flatbed trailer 12 has a framework 14 which includes side rails 16 extending longitudinally along the sides 18 of the trailer 12 which are transversely interconnected by cross members 20 upon which the bed 22 is supported. Depending on the spacing of the cross members 20 for a particular flat bed trailer 12, various mounting members, as described subsequently, which are rigidly attached to the cross members 20, may be used to support the storage apparatus 10; and where used, are considered to be a structural part of the framework 14 of the trailer.

The storage apparatus for flatbed trailers 10, in its preferred embodiment, includes a generally rectangular-shaped storage box 24, constructed of 3/16-inch aluminum flat stock, and having a length, width and depth of approximately 48-, 36-, and 18-inches, respectively. The front wall 26 of the storage box 24, which faces outwardly at a location on a side 18 of the trailer 12, has attached horizontally, on its upper portion 28 a front support member 30, which, as seen in FIG. 2 where the storage box 24 is in the up, traveling, position, is formed as a lip to engage on top of the inwardly extending lower flange 32 of the trailer side rail 16. The front support member 30 thus supports the front 62 of the storage box 24 in the up, traveling position. A rear support member 34, is attached to the trailer framework 14, as illustrated to a mounting member 36 structually attached between cross-members 20; and extends downward to support the rear 64 of the storage box 24. In the preferred embodiment, the rear support member 34 is U-shaped, with the lower, horizontal member 38 providing support, with the storage box 24 in the up, traveling position, along the bottom 40 of the box 24 adjacent to its rear wall 42. Bracing members 44, as shown attached to mounting members 46, may be used to provide additional stability for the rear support member 34. Thus, importantly, the storage box 24 in the up, traveling position is supported between the front support member 30 and the rear support member 34, and therefore all of the weight of the storage box 24 (and its contents) are directly and rigidly transferred to the sturdy trailer framework 14, while none of the weight in the up, traveling position is supported by the pivoting mechanism, subsequently described, used to move the storage box 24 between the up, traveling position and the down, loading and unloading position.

The movement of the storage box 24 between the up, traveling position, as illustrated in FIG. 2, and the down, loading and unloading position, as seen in FIG. 6, preferably is accomplished, by the power-assisted mechanism described below. The storage box 24 is supported during movement by two arm members 48, one on each side of the storage box 24. One end 50 of each arm member 48 is pivotally mounted, at 52, to the trailer framework 14, as through a mounting member 54 rigidly attached to a cross-member 20, while the other end 56 is pivotally attached at 58 to a side wall 60 of the storage box 24, so that the two arm members 48 are generally parallel and separated by the width of the box 24. The point 52 is located relatively close to the siderail 16 so that the arm members 48, pivoting about point 58 will both lower and outwardly move the box 24. Pivoting attachment point 58 is located on the side walls 60 of the storage box 24 to permit such lowering and outward movement of the storage box 24, and in addition, is placed sufficiently toward the rear wall 42 to provide an unbalanced downward bias to the front 62 of the box 24 so that the front 62 will drop lower than the rear 64 of the box 24 when supported at point 58. A pivot point 58 location at approximately one-third of the length of the box 24 from the rear 64 has worked well. The arm member 48 preferably is generally of an L-shape so that, as best seen in FIG. 6, the box 24 may be pivoted significantly to the outside of the side rail 16 without the arm members 48 coming into contact with side rail 16.

With the pivot point 58 located so as to bias the front 62 of the box 24 downward, the amount of such downward rotation, must be controlled. This is accomplished through a curved rail 66 which is attached to and supported, as illustrated, by mounting members 68 rigidly attached between the cross-members 20, of the trailer framework 14. The rail 66 has a riding surface 70 which generally faces downwards. A roller assembly 72 is provided, which includes a roller support arm 74 attached to the rear wall 42 of the box 24 so that it extends upwardly from the rear wall 42, and a roller 76 which rotates at the outer end 78 of the roller support arm 74. The roller 76 is positioned to engage the riding surface 70 of the curved rail 66 so as to limit the upward movement of the rear 64 of the box 24 at any position during its movement between the up, traveling position of FIG. 2 and the down, loading and unloading position of FIG. 6. A preferred shape of the curved rail 66 is as illustrated, presenting an easily accessible storage box 24 at its down, loading and unloading position, while providing a smooth transition between movement. While the preferred construction of the invention includes two rails 66 and corresponding roller assemblies 72, a single rail 66 and roller assembly 72 combination may also be suitable.

The movement of the storage box 24 between the above described up and down positions preferably is power-assisted. A preferred means of power-assistance is pneumatic, since it is conventional for each flatbed trailer 12 to have installed thereon an air tank 80 which stores a supply of pressurized air for activation of the braking system of the trailer 12. Utilizing the pressurized air within the air tank 80, a pair of dual-acting air cylinders 82 are pneumatically connected to the air tank 80 by air-carrying tubing 84 through a three-way pneumatic switch 86. Such switches characteristically have two positions 88 and 90 which are used, respectively, to direct the input air pressure to the two-way air cylinder 82 so as to either retract or expand the shaft 92 of the air cylinder 82. Such a pneumatic power-assist system is shown schematically at FIG. 7.

Each dual-acting air cylinder 82 is pivotally attached 98, at one end, preferably the cylinder end 94, to the framework 14 of the trailer 12, as at a mounting member 96 rigidly attached between cross members 20, while the other end of the air cylinder 82, represented by the shaft 92 extending therefrom, is pivotally attached at 100 to one of the arm members 48. Referring to FIG. 7, when the switch 86 retract position 88 is engaged, air pressure from air tank 80 to the air cylinder 82 retracts the shaft 92 into the air cylinder 82. Such air cylinder 82 retraction pivots the arm member 48 attached thereto, and the storage box 24, toward the air cylinder 82, and as configured in the illustrated preferred embodiment, up and towards the center of the trailer 12. Engaging of the switch 86 expand position 90 extends the shaft 92 out from the air cylinder 82, thus pushing the arm 48 and box 24 outward and away from the air cylinder 82.

A handle member 102 is attached to the front wall 26 of the storage box 24 beneath the front support member 30 to permit manual assistance when needed.

While operation of the storage apparatus for flatbed trailers 10 may be clear from the above, the following description of its operation and the method of storing is provided. Thus, with the storage box 24 in the up, traveling position beneath the bed 22 of the trailer 12, as seen in FIG. 2, FIG. 3, and FIG. 4, an operator engages the retract position 88 of the pneumatic switch 86, preferably positioned on or beneath the siderail 16 of the trailer 12 near the storage box 24. This causes the air cylinders 82 to retract, thereby pivoting the arm members 48, and the storage box 24, slightly inward on the trailer 12 to disengage the front support member 30 from the flange 32 of the siderail 16. With the front 62 of the storage box 24 no longer supported, the front 62 of the storage box 24 will, because of the designed unbalance, rotate downwards until the roller 76 at end of roller support arm 74 attached to the rear wall 42 of the storage box 24 contacts against the riding surface 70 of the curved rail 66. FIG. 5 illustrates the storage apparatus 10 following this initial retraction of the air cylinder 82.

The operator then engages the expand position 90 of the switch 86, which extends the shafts 92 from the air cylinders 82 to pivot the arm members 48 and the attached storage box 24 downwards and to the outside of the trailer 12, the rollers 76 continuing to engage the rail 66 to regulate the upward movement of the rear 64 of the storage box 24 and the downward movement of the front 62 of the storage box 24. Expansion of the air cylinders 82 is continued by the operator until the storage box 24 is below and outwards of the siderail 16 of the trailer 12 and its top 104 is available for the loading or unloading of tarpaulins or other gear, as seen at FIG. 6. FIG. 5 shows, in the dashed lines, an interim position during the transition movement.

Movement of the storage box 24 from the down position of FIG. 6 to the up position of FIGS. 2, 3, and 4 is a similar process, in reverse. The operator engages the retract position 88 of the switch 86 so that the air cylinders 82 retract their shafts 92, moving the arm members 48 and the storage box 24, with rollers 76 still engaged with the curved rails 99, inwards toward the center of the trailer 12. As the air cylinders 82 continue to retract, the box 24 pivots inward and upward on the arm members 48 until the air cylinders 82 are fully retracted and the bottom 40 of the box 24 at its rear wall 42 is proximate to, and above, the horizontal support arm 38 of the rear support member 34. The operator then, having released the retract position 88 of the switch 86, manually lifts, that is, pivots about pivot points 58, by the attached handle member 102, the front 62 of the box 24 so that the rear 64 of the box 24 lays atop the horizontal support arm 38 of the rear support member 34, and simultaneously engages the expand position 90 of the switch 86 so that expansion of the air cylinder 82 shaft 92 pushes the arm members 48 and box 24 horizontally outwards a short distance until the front support member 30 on the upper front edge 28 of the box 24 comes into engagement above and with the lower flange 32 of the siderail 16. At this point, the storage box 24 has been returned to the up, traveling position where it is completely supported at its front 62 by the front support member 30 and siderail 16, and at its rear 64 by the rear support member 34 mounted to the framework 14 of the trailer 12, without any weight of the storage box 24, or its contents, being retained on the arm members 48, air cylinders 82 or other parts of the power-assisted movement mechanism.

It is thought that the storage apparatus for flatbed trailers and the method of storage of the present invention and its many attendant advantages will be understood from the foregoing description and that it will be apparent that various changes may be made in form, construction and arrangement of the parts thereof without departing from the spirit and scope of the invention or sacrificing all of its material advantages, the forms hereinbefore stated being merely exemplary embodiments thereof.

I claim:

1. A storage apparatus in combination with a flatbed trailer having a framework which includes longitudinal side rails, spaced transverse cross members, and mounting members rigidly attached thereto, the storage apparatus comprising:
   a. a storage box, having a front and a rear which are oriented parallel to the longitudinal side rails of the flatbed trailer, the front being closer to the side rail and the back being more distant from the side rail;
   b. a first support means for supporting the storage box in an up, traveling position beneath the flatbed trailer, said first support means formed to structurally and rigidly engage with the framework of the trailer so as to completely support the weight of the storage box and contents in said up, traveling position, said first support means including a front support member in the form of a lip attached horizontally on, and extending outwardly from, the front of said storage box so as to engage on top of an inwardly extending flange of the side rail of the trailer, said engagement of the front support member on the flange of the side rail supporting the front of the storage box, and a rear support member, rigidly attached to the trailer framework and extending downwardly to engage the rear of the storage box so as to support the rear of the storage box;
   c. a second support means, separate from the first support means, for supporting the storage box while in transition between the up, traveling position and a down, loading and unloading position, said second support means formed to pivotally engage with the framework of the trailer so as to support the weight of the storage box and contents during said transition.

2. The storage apparatus, as recited in claim 1, wherein additionally there are power-assist means formed to provide physical assistance in the movement of the storage box while in said transition under said second support means.

3. The storage apparatus, as recited in claim 2, where the power-assist means are pneumatic.

4. The storage apparatus, as recited in claim 3, where, said flatbed trailer having an air tank installed thereon, the pneumatic power-assist means include:

a. at least one dual-acting air cylinder capable of linear expansion and retraction under air pressure, having a first end and a second end, with the first end of said air cylinder being pivotally attached to said arm member and the second end of said air cylinder being pivotally attached to the trailer framework;

b. a pneumatic switch formed to receive air pressure from said air tank and direct its flow to said dual-acting air cylinder so to create said linear expansion and retraction of said air cylinder; and c. air-carrying tubing interconnecting said air tank, pneumatic switch, and dual-acting air cylinder.

5. The storage apparatus, as recited in claim 1, wherein the rear support member is a U-shaped frame, having a horizontal base which engages beneath the rear of the storage box, and upwardly extending legs which are rigidly attached to the framework of the trailer.

6. The storage apparatus, as recited in claim 1, wherein the storage box has two opposing sides which are oriented transversely to the longitudinal side rails of the trailer, said second support means including:

two arm members, each having a first end and a second end, with the first end of each arm member being pivotally attached to one of said opposing sides of the storage box and the second end of each arm member being pivotally attached to the framework of the trailer, the orientation of the two arm members being substantially parallel to each other and transverse to the side rail of the trailer.

7. The storage apparatus, as recited in claim 6, where the pivotal attachements of the two arm members on the opposing sides of the storage box are located so that the storage box is pivotally unbalanced with the front of the storage box being biased downwardly with respect to the rear of the storage box; there additionally being at least one curved rail member, attached to and supported by the framework of the trailer, said rail member having a riding surface generally facing downwards, and at least one roller assembly, including a roller support arm rigidly attached at one end to the rear of the storage box and extending upwardly therefrom and having at the other end a roller which rotates thereat, said roller support arm and roller being positioned to engage said curved rail member on its riding surface and thereby limit upward movement of the rear of the storage box while the storage box is supported by the second support means.

8. The storage apparatus, as recited in claim 6, wherein said arm members are curved within respective planes transverse to the side rail, so as to, with the arms in a position corresponding to the down, loading and unloading position, project the first end of said arm members outward of, and beneath, the longitudinal side rails of the flatbed trailer.

9. The storage apparatus, as recited in claim 1, where, additionally, there are manual-assistance means in the form of a handle member attached to the front of the storage box.

10. A storage apparatus in combination with a flatbed trailer having a framework which includes longitudinal side rails, spaced transverse cross members, and mounting members rigidly attached thereto, the storage apparatus comprising:

a. a storage box, having a front and a rear which are oriented parallel to the longitudinal side rails of the flatbed trailer, the front being closer to the side rail and the back being more distant from the side rail, and having two opposing sides which are oriented transversely to the longitudinal side rails of the trailer;

b. a handle member attached to the front of the storage box;

c. a first support means for supporting the storage box in an up, traveling position beneath the flatbed trailer, said first support means formed to structurally and rigidly engage with the framework of the trailer so as to completely support the weight of the storage box and contents in said up, traveling position, said first support means including:

(1) a front support member in the form of a lip attached horizontally on, and extending outwardly from, the front of said storage box so as to engage on top of an inwardly extending flange of the side rail of the trailer, said engagement of the front support member on the flange of the side rail supporting the front of the storage box, (2) a rear support member, formed as a U-shaped frame, having a horizontal base which engages beneath the rear of the storage box and upwardly extending legs which are rigidly attached to the framework of the trailer, so as to support the rear of the storage box;

d. a second support means, separate from the first support means, for supporting the storage box while in transition between the up, traveling position and a down, loading and unloading position, said second support means formed to pivotally engage with the framework of the trailer so as to support the weight of the storage box and contents during said transition, said second support means including:

(1) two arm members, each having a first end and a second end, with the first end of each arm member being pivotally attached to one of said opposing sides of the storage box and the second end of each arm member being pivotally attached to the framework of the trailer, the orientation of the two arm members being substantially parallel to each other and transverse to the side rail of the trailer;

(2) the arm members being curved within respective planes transverse to the side rail so as to, with the arms in a position corresponding to the down, loading and unloading position, project the first end of said arm members outward of, and beneath, the longitudinal side rails of the flatbed trailer;

(3) the pivotal attachments of the two arm members on the opposing sides of the storage box being located so that the storage box is pivotally unbalanced with the front of the storage box being biased downwardly with respect to the rear of the storage box;

(4) at least one curved rail member, attached to and supported by the framework of the trailer, said rail member having a riding surface generally facing downwards; and (5) at least one roller assembly, having a
(a) roller support arm rigidly attached at one end to the rear of the storage box and extending upwardly therefrom; and
(b) a roller at the other end of the roller support arm which rotates thereat;

(c) said roller support arm and roller being positioned to engage said curved rail member on its riding surface and thereby limit upward movement of the rear of the storage box while the storage box is supported by the second support means;

e. pneumatic power-assist means which include:
  (1) at least one dual-acting air cylinder capable of linear expansion and retraction under air pressure, having a first end and a second end, with the first end of said air cylinder being pivotally attached to a said arm member and the second end of said air cylinder being pivotally attached to the trailer framework;
  (2) a pneumatic switch formed to receive air pressure from said air tank and direct its flow to said dual-acting air cylinder so to create said linear expansion and retraction of said air cylinder; and
  (3) air-carrying tubing interconnecting said air tank, pneumatic switch, and dual-acting air cylinder.

11. A method of storage, in combination with flatbed trailers having a framework which includes longitudinal side rails, spaced transverse cross members, and mounting members rigidly attached thereto, and also having an air tank installed thereon, the method of storage, where the storage box is initially in an up, traveling position on the trailer, includes the following steps:

a. retracting a two-way air cylinder attached to an arm member pivotally connecting a storage box to the trailer framework, thereby disengaging a front support member attached to the storage box from an inwardly extending flange of the longitudinal side rail of the trailer, and allowing the front support member to drop below the side rail, thereby disengaging from the storage box a rear support member rigidly mounted to the trailer framework;

b. expanding the air cylinder, causing an arm member attached thereto, and the storage box, to pivot downwards and outwardly until the storage box is exposed below and outside of the longitudinal side rail of the track;

c. loading and unloading of the storage box, as desired;

d. retracting said air cylinder, causing the attached arm member and storage box to pivot upwardly and beneath the flatbed trailer;

e. lifting a handle member attached to a front surface of the storage box, thereby pivoting and engaging the storage box with the rear support member rigidly attached to the framework of the trailer, and while so lifting;

f. expanding the two-way air cylinder, thereby re-engaging the front support member of the storage box with the inwardly extending flange of the longitudinal side rail of the trailer, and returning the storage box to rigid framework support for traveling.

* * * * *